United States Patent
Brooks et al.

(10) Patent No.: US 12,362,423 B2
(45) Date of Patent: Jul. 15, 2025

(54) ELECTRIC VEHICLE BATTERY ENCLOSURE

(71) Applicant: FLEX-N-GATE ADVANCED PRODUCT DEVELOPMENT, LLC, Warren, MI (US)

(72) Inventors: Geoffrey Brooks, Macomb, MI (US); Steve Perucca, Clinton Township, MI (US); Robert L Fontichiaro, Saline, MI (US); John Chiang, Commerce Township, MI (US); Paul Martini, Tecumseh (CA); Derek Bezaire, Amherstburg (CA); Aaron Boyer, Washington, MI (US)

(73) Assignee: FLEX-N-GATE ADVANCED PRODUCT DEVELOPMENT, LLC, Warren, MI (US)

( * ) Notice: Subject to any disclaimer, the term of this patent is extended or adjusted under 35 U.S.C. 154(b) by 465 days.

(21) Appl. No.: 17/743,074

(22) Filed: May 12, 2022

(65) Prior Publication Data
US 2022/0367957 A1    Nov. 17, 2022

Related U.S. Application Data

(60) Provisional application No. 63/188,898, filed on May 14, 2021.

(51) Int. Cl.
H01M 50/249    (2021.01)
H01M 50/236    (2021.01)
(Continued)

(52) U.S. Cl.
CPC ....... *H01M 50/249* (2021.01); *H01M 50/236* (2021.01); *H01M 50/242* (2021.01);
(Continued)

(58) Field of Classification Search
CPC ............. H01M 50/249; H01M 50/236; H01M 50/242; H01M 50/244; H01M 50/271; H01M 2220/20
See application file for complete search history.

(56) References Cited

U.S. PATENT DOCUMENTS 9,056,631 B2    6/2015  Nakamori
9,331,321 B2    5/2016  Berger et al.
(Continued)

FOREIGN PATENT DOCUMENTS

CN    102092267 A    6/2011
CN    107150581 A    9/2017
(Continued)

OTHER PUBLICATIONS

Extended European Search Report issued in connection with EP Appl. Ser. No. 22173379.3 dated Jun. 10, 2022.

*Primary Examiner* — Jacob B Meyer
(74) *Attorney, Agent, or Firm* — FOLEY & LARDNER LLP

(57) ABSTRACT

A battery enclosure includes a tub defining an internal volume, a lid, a cross member within the internal volume, and a mounting bracket. The tub has a bottom and a wall integrally formed with the bottom. The lid is configured to couple to the wall to enclose the internal volume. The cross member is coupled to the tub. The mounting bracket is attached to the bottom of the tub and is configured to releasably secure a battery.

18 Claims, 6 Drawing Sheets

(51) Int. Cl.
*H01M 50/242* (2021.01)
*H01M 50/244* (2021.01)
*H01M 50/271* (2021.01)

(52) U.S. Cl.
CPC ....... *H01M 50/244* (2021.01); *H01M 50/271* (2021.01); *H01M 2220/20* (2013.01)

(56) References Cited

U.S. PATENT DOCUMENTS

| | | | |
|---|---|---|---|
| 9,590,216 | B2 | 3/2017 | Maguire et al. |
| 9,722,223 | B1 | 8/2017 | Maguire |
| 10,069,123 | B2 | 9/2018 | Maguire |
| 10,461,383 | B2 * | 10/2019 | Haag ................... H01M 50/264 |
| 10,549,706 | B2 | 2/2020 | Syed et al. |
| 10,886,513 | B2 | 1/2021 | Stephens et al. |
| 11,084,386 | B2 * | 8/2021 | Howard .................... B60K 1/04 |
| 11,211,656 | B2 * | 12/2021 | Matecki ............... H01M 50/271 |
| 2016/0204401 | A1 * | 7/2016 | Curtis ................ H01M 50/209 429/153 |
| 2018/0337377 | A1 * | 11/2018 | Stephens ............. H01M 50/224 |
| 2019/0081298 | A1 * | 3/2019 | Matecki ................. B60R 19/12 |
| 2020/0384842 | A1 * | 12/2020 | Qin ........................ B62D 25/20 |
| 2021/0111388 | A1 | 4/2021 | Stephens et al. |
| 2021/0210808 | A1 * | 7/2021 | Schmitz .............. H01M 10/615 |
| 2024/0174091 | A1 * | 5/2024 | Collins ................ H01M 50/271 |
| 2024/0222772 | A1 * | 7/2024 | Huang ..................... B60L 58/26 |

FOREIGN PATENT DOCUMENTS

| | | | |
|---|---|---|---|
| CN | 109109644 A | 1/2019 | |
| CN | 109390517 A | 2/2019 | |
| CN | 105024024 B | 1/2021 | |
| DE | 23 32 761 B1 | 1/1977 | |
| DE | 10 2015 207 746 A1 | 11/2015 | |
| DE | 10 2017 103 371 A1 | 9/2017 | |
| DE | 10 2018 114 884 A1 | 12/2018 | |
| DE | 10 2018 118 742 A1 | 2/2019 | |
| EP | 2 332 761 B1 | 6/2011 | |
| EP | 3486101 A1 * | 5/2019 | ............... B60K 1/04 |
| FR | 2332761 B1 | 11/1978 | |
| JP | 5013140 B2 | 8/2012 | |
| KR | 101149700 B1 | 5/2012 | |
| WO | WO-2018/213306 A1 | 11/2018 | |

* cited by examiner

ELECTRIC VEHICLE BATTERY ENCLOSURE

CROSS-REFERENCE TO RELATED PATENT APPLICATION

This application claims the benefit of and priority to U.S. Provisional Application No. 63/188,898, filed on May 14, 2021, the entire disclosure of which is hereby incorporated by reference herein.

BACKGROUND

The present disclosure relates generally to the field of battery enclosures for vehicles. More specifically, the present disclosure relates to battery enclosures for use in electric vehicles (EVs). Typical battery enclosures include a multi-piece construction that requires the application of a water tight seal between a bottom plate and a plurality of side walls. Existing battery enclosures require processes and materials that add labor and complexity to the fabrication and assembly processes. Typical battery enclosures require strict tolerances between components for assembly and the application of sealing methods following assembly. Additionally, the sealed interfaces between the side walls and bottom are subject to failure modes including leaking and fracture. Existing tub designs are typically heavy and require an undesirable amount of material, time, and cost to manufacture.

SUMMARY

At least one embodiment relates to a battery enclosure for enclosing batteries for an electric vehicle. The battery enclosure includes a tub defining an internal volume, a lid, a cross member within the internal volume, and a mounting bracket. The tub has a bottom and a wall integrally formed with the bottom. The lid is configured to couple to the wall to enclose the internal volume. The cross member is coupled to the tub. The mounting bracket is attached to the bottom of the tub and is configured to releasably secure a battery.

In some embodiments, the cross member is formed at least partially using a roll forming process.

In some embodiments, the cross member extends laterally across the internal volume.

In some embodiments, the cross member is formed from a single piece of material.

In some embodiments, the lid is supported by the wall and at least one battery coupled to the mounting bracket.

In some embodiments, the wall defines an interior surface. In some embodiments, the cross member includes a first end and a second end. In some embodiments, the first end is coupled to a first portion of the interior surface and the second end is coupled to the second portion of the interior surface.

In some embodiments, the cross member is coupled to the bottom between the first end and the second end.

In some embodiments, the cross member is a first cross member. In some embodiments, the battery enclosure includes a second cross member coupled to the tub and spaced from the first cross member.

In some embodiments, the mounting bracket is coupled to the bottom between the first cross member and the second cross member.

In some embodiments, the bottom includes stiffening features formed in a space between the first cross member and the second cross member.

Another embodiment relates to a battery enclosure for an electric vehicle. The battery enclosure includes a metal tub, a lid, multiple supports and a mounting plate. The metal tub defines an internal volume. The lid is configured to couple to the metal tub to enclose the internal volume. The multiple supports are within the internal volume and are coupled to the metal tub. The multiple supports include a first support and a second support. The mounting plate is coupled to the metal tub within a space between the first support and the second support. The multiple supports are configured to surround a battery within the internal volume on two sides of the battery.

In some embodiments, the metal tub is formed from a single sheet of metal and is formed from a single sheet of metal via a deep-drawing process.

In some embodiments, the single sheet of metal is steel or aluminum, and the thickness of the metal is between 0.5 mm and 2 mm.

In some embodiments, the plurality of supports include martensitic steel.

In some embodiments, the plurality of supports are shaped via a roll forming process.

Another embodiment relates to a method. The method includes forming, via a stamping process, a tub having a bottom and a continuous side wall integrally formed with the bottom. The tub defines an internal volume. The method further includes attaching a plurality of cross members to the tub within the internal volume. The plurality of cross members are fabricated via a roll forming process. The method further includes coupling a mounting bracket to the bottom of the tub. The mounting bracket configured to secure at least one battery. The mounting bracket is configured to secure at least one battery. The method further includes coupling at least one battery to the mounting bracket within the internal volume and coupling a lid to the tub to thereby enclose and seal the internal volume.

In some embodiments, the method includes, subsequent to forming the tub, forming stiffening features in the bottom of the tub.

In some embodiments, the tub is made of a single piece of steel or aluminum having a thickness between 0.5 mm and 2.0 mm.

In some embodiments, the plurality of cross members are coupled to at least three internal faces of the tub.

In some embodiments, an average material thickness of the continuous side wall is less than an average material thickness of the bottom.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, disclosed herein is a battery enclosure (e.g., battery container, battery housing, battery compartment, etc.) for vehicles that utilize electric energy (e.g., hybrid vehicles, electric vehicles, autonomous electric vehicles, unmanned electric vehicles, etc.) to create useful work (e.g., forward propulsion of the vehicle, non-propulsion applications, etc.). The battery enclosure may be for any vehicle type (e.g., sedan, truck, van, transit vehicle, commercial vehicle, semi-truck, hauling equipment, work vehicles, etc.) and may be positioned on the vehicle in various arrangements. According to some embodiments, the battery enclosure may be used on-board any vehicle that is partially or fully propelled by electric energy (e.g., electricity) and is configured to house energy storage devices (e.g., batteries, capacitors, etc.) for electric energy storage on-board the vehicle. In an exemplary embodiment, the battery enclosure is mounted to the chassis below the vehicle's cabin and is used to secure enclosed batteries to the vehicle.

Still referring generally to the FIGURES, the battery enclosure is advantageously sealed to prevent any inadvertently leaked electrolyte (or other contaminate or chemical) from reaching the external environment. The side walls of the battery enclosure are integrally formed with the bottom of the enclosure through a stamping process to reduce the complexity, weight, cost, and likelihood of failure (e.g., leaking) of the battery enclosure. Additionally, the integrally formed walls of the single-piece tub design reduce the amount of time and material required to fabricate the battery enclosure. In some embodiments, the battery enclosure is configured to protect the enclosed batteries from debris or obstructions in the surrounding environment (e.g., dirt, rocks, liquids, curbs, poles, etc.).

Figure 1:
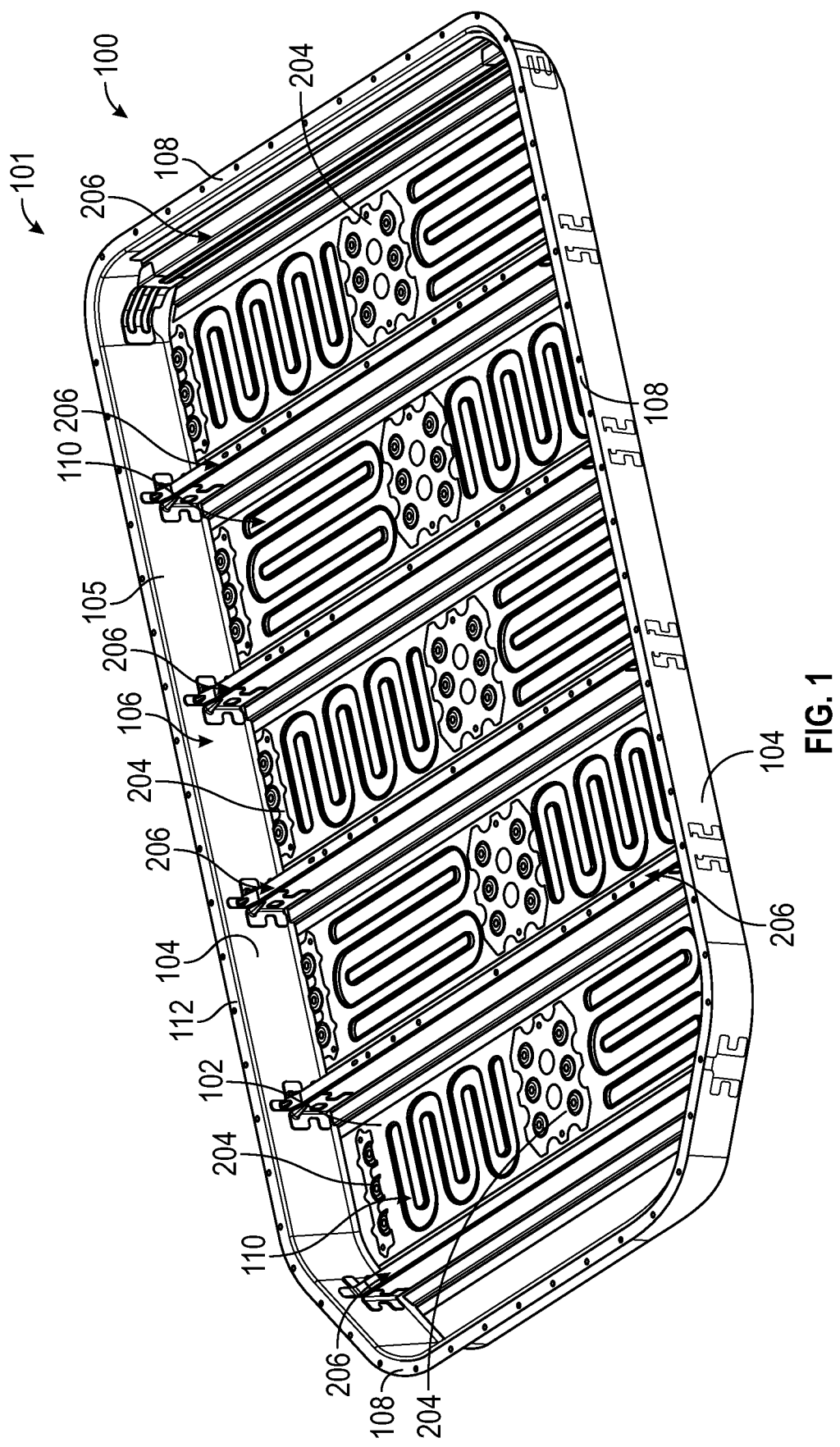
FIG. 1 is a perspective view of a tub assembly, according to an exemplary embodiment.

Referring to FIG. 1, a battery enclosure (e.g., battery container, battery housing, battery compartment, etc.) is shown as battery tub assembly 100 according to one embodiment. The battery tub assembly 100 includes a tub (e.g., container, tray, etc.), shown as tub 101, cross members or supports (e.g., stringers, cross bars, etc.) shown as stringers 206, and mounts (e.g., mounting brackets, fixing bracket, fastening bracket, etc.), shown as mounting brackets 204. The tub 101 includes a bottom (e.g., base, floor, etc.) shown as bottom 102, and a wall, shown as wall 104. The wall 104 and bottom 102 define an internal volume 106. In some embodiments, the wall 104 is integrally formed with the bottom 102 and is continuous about the periphery of the bottom 102. In some embodiments, the wall 104 has an upper edge, shown as upper edge 112, an interior surface 105, and an outer surface. As shown in FIGS. 1-5, the upper edge 112 includes a flange 108. As shown in FIG. 4, the flange 108 is configured to be sealed to a lid 216. As shown in FIG. 1, the stringers 206 are attached (e.g., welded, bonded, adhered, bolted, etc.) to the wall 104 and the bottom 102. In some embodiments, the stringers 206 may be attached to the bottom 102 along their length to improve the structural integrity of the tub 101. For example, some or all of the length of the stringers 206 may be attached to the bottom 102.

Figure 2:
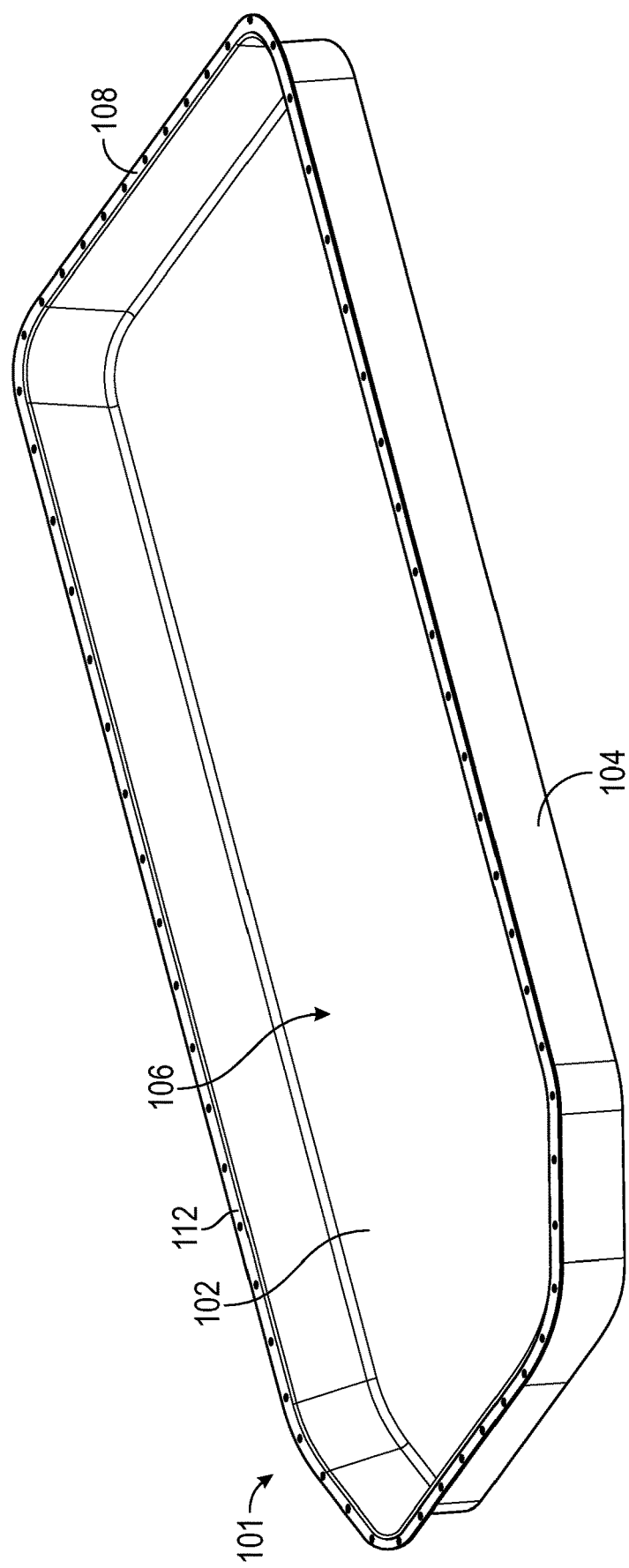
FIG. 2 is a perspective view of a tub used in a tub assembly, according to an exemplary embodiment.

As shown in FIG. 2, according to one embodiment, tub 101 is formed from a single-piece of material. In an exemplary embodiment, the single-piece of material is formed (e.g., stamped, deep-drawn) into a tub shape which defines bottom 102 and wall 104. In some embodiments, the tub shape may have substantially different proportions than the proportions of tub 101 shown in FIG. 2. For example, the wall 104 of the tub 101 may be taller or shorter than shown in FIG. 2, and the flange 108 may be smaller or larger. In some embodiments, the flange 108 may include features to facilitate mounting to the lid 216 and/or to the vehicle. Additionally, in some embodiments, the bottom 102 may be in a shape such as a substantially rectangular, circular, elliptical, triangular, or polygonal shape, or any combination thereof. In an some embodiments, the bottom 102 is substantially flat. However, in other embodiments, the bottom 102 is not flat or substantially flat, and may be fabricated in other shapes and forms to accommodate various batteries, combinations of batteries, and/or various design constraints of one or more electric vehicles for which the battery enclosure is intended to be implemented.

The tub 101 may be made of a metal (steel, aluminum, etc.), a metal alloy, polymer, composite material, or any combination thereof. In an exemplary embodiment, the tub 101 has a material thickness that is suitable for a stamping process (e.g., deep-draw stamping, deep-drawing, metal stamping, etc.). In an exemplary embodiment, the tub 101 is stamped from a single sheet of steel (e.g., DP600) at a thickness of 1 mm. In other embodiments, the tub 101 is formed (e.g., stamped) from other grades, thicknesses, and/or types of materials. For example, the tub may be made from aluminum (e.g., Aluminum 6061) and may have a material thickness (e.g., an average material thickness) of 2 mm. In some embodiments, the thickness of the tub material ranges from 0.5 mm to 2.0 mm. For example, the material thickness of the wall 104 may be approximately 0.5 mm and the material thickness of the bottom may be approximately 2.0 mm. In some embodiments, at least a portion of the wall has a material thickness that is less than the material thickness than the bottom (e.g., the average material thickness of the bottom). The thickness of the tub 101 material may be selected based on material specific properties and characteristics (e.g., formability, drawability, Lankford coefficient, fracture strain, strength, hardness, etc.). In some embodiments, the thickness of the material selected for the tub 101 is substantially uniform prior to stamping. For example, the material selected for the tub 101 may be a sheet or blank (e.g., a metal sheet, sheet metal, a blank, etc.). In some embodiments, the material thickness of the wall 104 is thinner than the bottom 102 due to elongation of the material in the wall 104 that occurs during the stamping process (e.g., deep-drawing, deep-drawn stamping, metal pressing, etc.). In some embodiments, the material for the tub 101 is pressed into a die or several successive dies to achieve the final shape the tub 101.

As shown in FIG. 2, the material of tub 101 plastically deforms and work hardens during the forming process (e.g., stamping process, deep-drawing process, etc.) and causes the hardness of the material to increase. In an exemplary embodiment, the enhanced hardness and strength of the tub 101 contributes to the structural integrity and rigidity of the battery tub assembly 100. In some embodiments, the tub 101 may be heat treated to increase the hardness of the material using a heat treatment process. For example, the tub 101 may be hardened by heating the tub 101 material above the normalizing (e.g., critical) temperature and then quickly cooling the material (e.g., quenching). In some embodiments, the tub 101 may be tempered. In an exemplary embodiment, stiffening features (e.g., beading, corrugation, ribbing, etc.), shown as stiffening features 110 (see FIG. 1), may be added to the tub 101 to work harden areas of the tub 101 (e.g., areas near the mounting brackets 204) to enhance the structural rigidity of the tub 101. In some embodiments, the tub 101 undergoes a stress relieving process (e.g., annealing) to restore material elasticity and ductility which improves the workability and drawability of the material for subsequent shaping or forming processes (e.g., stamping, drawing, punching, rolling, etc.).

Figure 3:
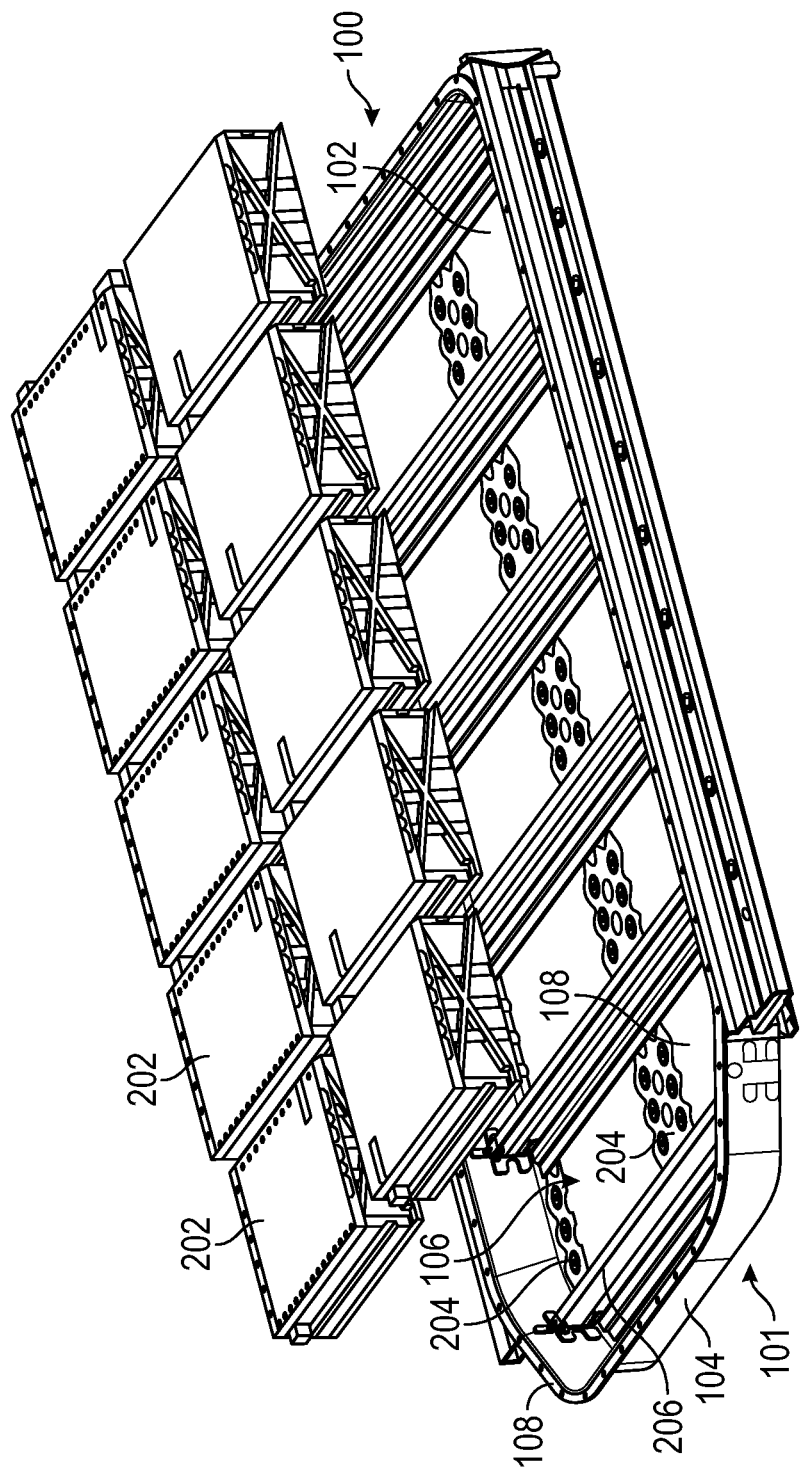
FIG. 3 is a perspective view of a tub assembly with batteries offset above the tub assembly, according to an exemplary embodiment.
Figure 4:
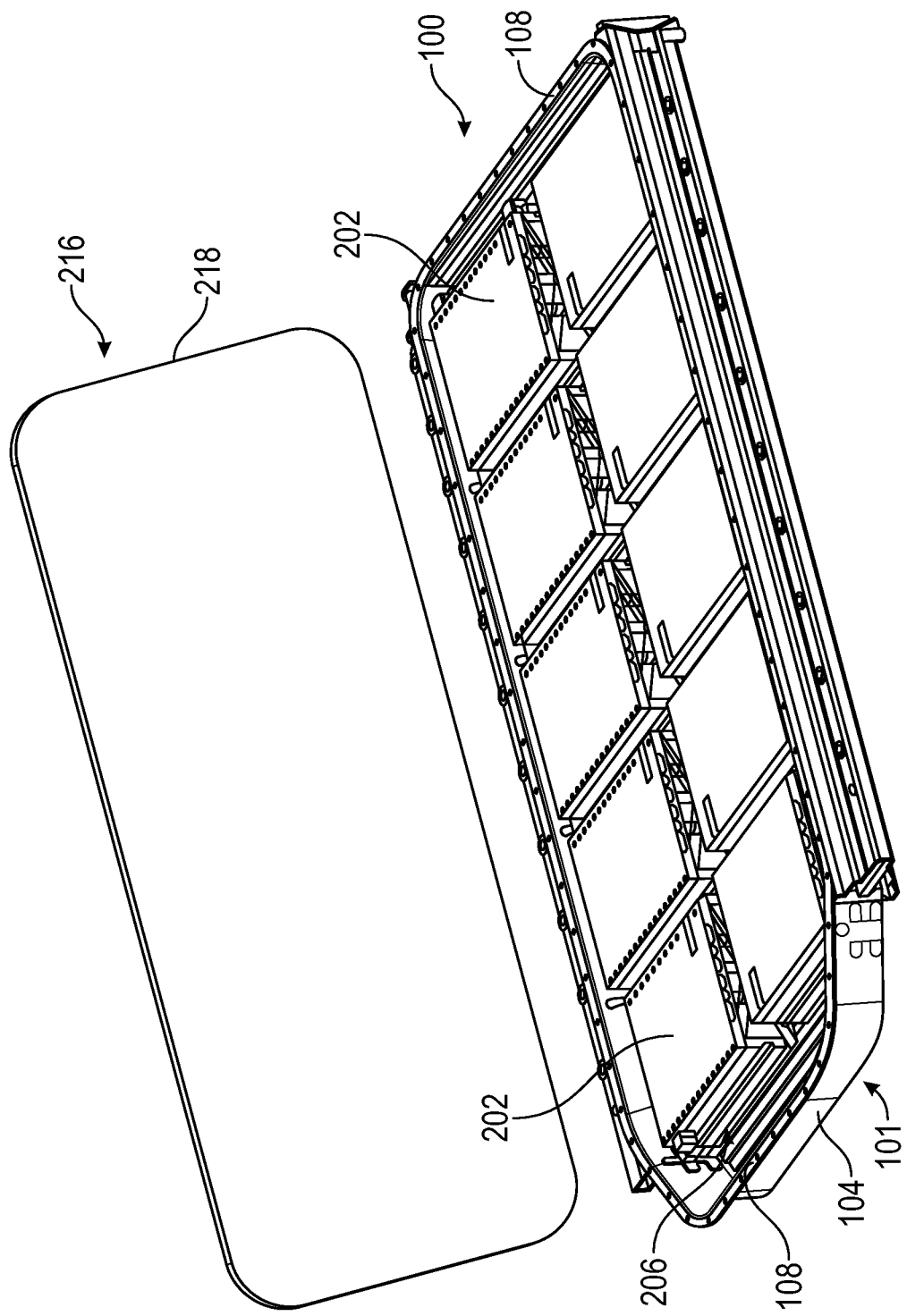
FIG. 4 is a perspective view of a tub assembly with a lid angularly offset from the tub assembly and including batteries, according to an exemplary embodiment.
Figure 5:
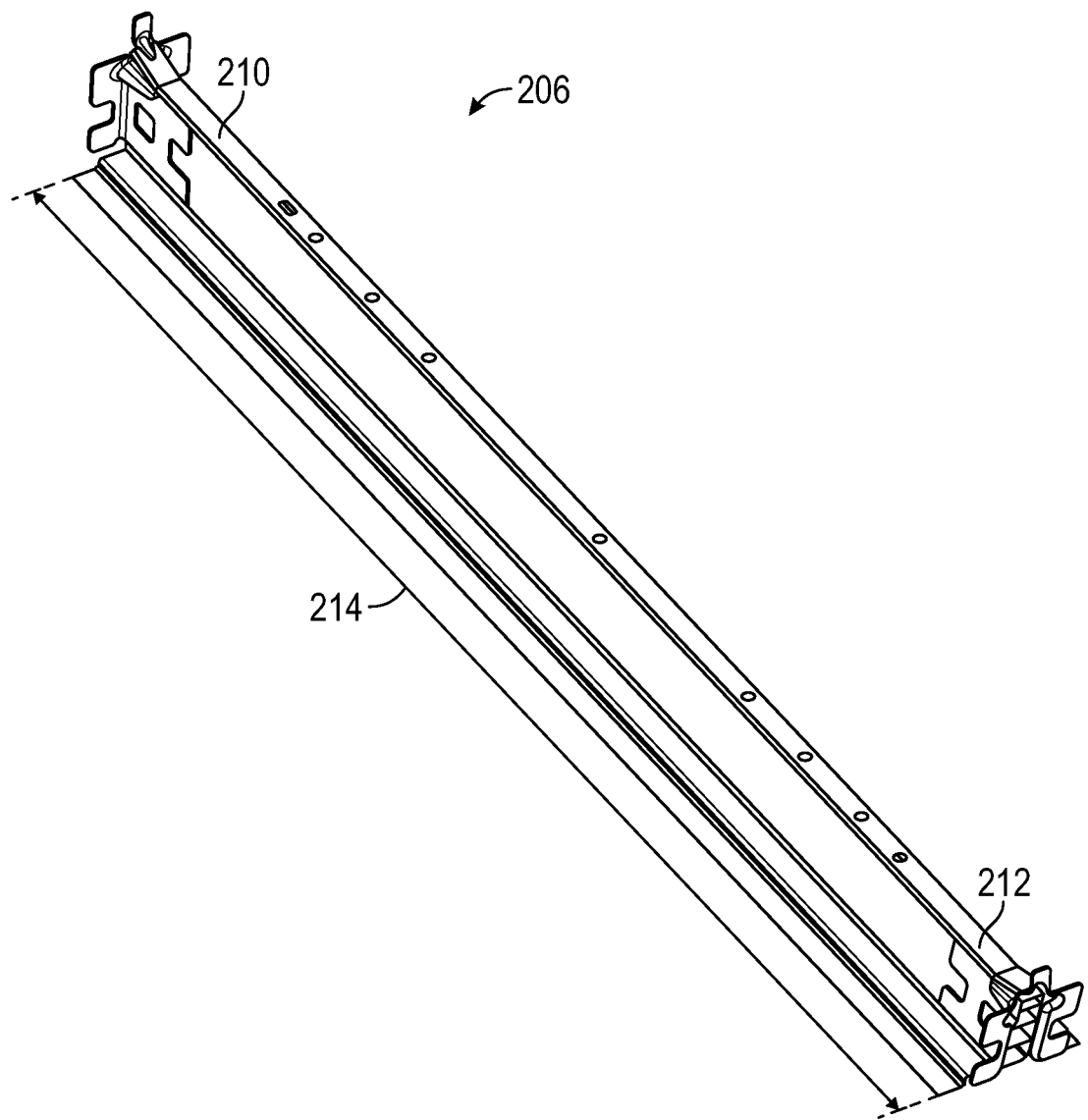
FIG. 5 is a perspective view of a stringer, according to an exemplary embodiment.

Referring to FIG. 3, the battery tub assembly 100 is shown in an exploded view with a number of batteries (e.g., a battery array), shown as batteries 202, in an offset position above the battery tub assembly 100 according to one embodiment. The battery tub assembly 100 includes mounting brackets 204. In some embodiments, the mounting brackets 204 are fixedly coupled (e.g., welded, mounted, fastened, adhered, etc.) to an internal surface of the tub 101. In an exemplary embodiment, the mounting brackets 204 are fixedly coupled to the interior surface of the bottom 102. In an embodiment, the mounting brackets 204 may be configured to releasably secure the batteries 202 in a fixed position. For example, the mounting brackets 204 may include threaded holes that are configured to receive a fastener (e.g., a securing bolt) that secures a flange on a battery 202 to the mounting bracket 204. As shown in FIG. 3, the stringers 206 extend laterally across the internal volume 106. As shown in FIG. 5, the stringer 206 has a first end 210 and a second end 212. In an exemplary embodiment, the first end 210 and the second end 212 are fixedly coupled to internal faces (e.g., faces of the interior surface 105) of wall 104. In some embodiments, the stringer 206 is coupled to at least one internal face of the tub 101. For example, the stringer 206 may be attached to one or more internal surfaces and/or internal faces of the tub 101. In some embodiments, the stringers 206 are interspaced by a width suitable for fitting a battery. For example, the stringers 206 may be spaced by a width, height, length, diameter, or other measures of battery 202. As shown, the spaces between the stringers 206 may be sized and shaped to accommodate one or more battery 202 and may have one or more mounting bracket 204. In some embodiments, the batteries 202 are positioned within the internal volume such that a stringer 206 surrounds each of the batteries 202 on at least two sides of the battery. In this way, the stringers 206 may advantageously support and protect the batteries 202 when the batteries 202 are installed within the internal volume 106.

Referring to FIG. 4, the battery tub assembly 100 is shown with the batteries 202 releasably secured to the mounting brackets 204 by a securing mechanism (e.g., at least one of a nut/bolt configuration, fastener, snap-fit fastener, etc.). In some embodiments, the shape of the flange 108 is formed by a material removal process (e.g., a trimming process) that removes excess material utilized during a process that forms the wall 104 and bottom 102 (e.g., a drawing process). As shown in FIG. 4, the lid 216 has an outer edge (e.g., edge, periphery, outermost edge, rim, etc.), shown as rim 218. In some embodiments, the lid 216 may be substantially flat, or may be a concave and/or convex shape. In some embodiments, the lid 216 may include stiffening features (e.g., stiffening features 110) and may be formed by a stamping process. In some embodiments, the rim 218 may be shaped to align with the upper edge 112 of the tub 101 (e.g., shaped similarly to flange 108). The lid may be supported by the wall 104 at the rim 218, and may also be supported by other features mounted to the interior of the tub 101. For example, the lid 216 may be supported by both the wall 104 and an interior feature (e.g., a rubber pad) situated on a battery 202. In some embodiments, the lid 216 is made of a material similar to or the same as the material of the tub (e.g., steel, aluminum, etc.). In some embodiments, the lid 216 is configured to be fixedly coupled (e.g., welded, adhered, bonded, fastened, etc.) and sealed (e.g., using a sealant such as polyurethane) to the flange 108 to completely enclose and seal the internal volume 106. Advantageously, the one-piece design of the tub 101 does not require additional sealing between the wall 104 and bottom 102, according to some embodiments. In an exemplary embodiment, the tub 101 is sealed between the rim 218 and the flange 108 to completely seal and enclose the internal volume 106.

Referring to FIG. 5, the stringer 206 is shown in greater detail according to one embodiment. The stringer 206 includes a first end 210, a second end 212, and a length extending from the first end 210 to second end 212, shown as length 214. In an exemplary embodiment, the stringers 206 have a height that is greater than their width to resist bending about the neutral axis in the plane containing the height. The disproportionate height and width of the stringer 206 may be facilitate an material efficient design, which may reduce the overall weight of the stringer 206, and thereby reduce the weight of the battery tub assembly 100. Ultimately, a reduction in weight of the battery tub assembly 100 may facilitate an improved range and efficiency of an associated electric vehicle. In some embodiments, the thickness of the stringer 206 is selected such that the stringer is configured to resist buckling under an axial load. For example, the stringers may have a material thickness that is sufficient to resist buckling when subjected to an axial load during a collision along the side of the tub 101. In some embodiments, the stringers 206 may have a cross sectional profile that provides enhanced resistance to deformation under specific loading conditions (e.g., I-shape, T-shape, L-shape, U-shape, etc.). In some embodiments the cross section of the stringer 206 may vary along length 214. In some embodiments, the stringers 206 are made from a high strength material (e.g., martensitic steel, other steels, alloys, composites, etc.) and may be formed by a property enhancing forming process such as roll forming. In other embodiments, the stringers 206 may be fabricated by a process such as extruding, press braking, stamping, forging, casting, or other similar or dissimilar forming and/or shaping processes. In some embodiments, stringers are formed using a sequence of forming and shaping processes (e.g., roll forming, punching, milling, cutting, etc.).

Figure 6:
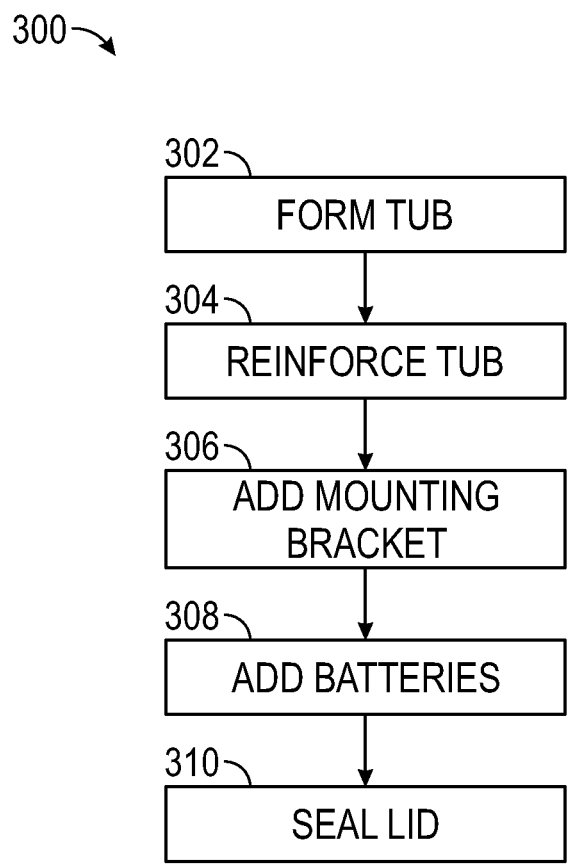
FIG. 6, is a block diagram showing a method of manufacturing a tub assembly, according to an exemplary embodiment.

Referring to FIG. 6, a block diagram of a method 300 of manufacturing a battery enclosure (e.g., battery tub assembly 100 of FIG. 1) is shown according to an exemplary embodiment. Notably, the steps can be altered or rearranged depending on methods of other embodiments. In an exemplary embodiment, a coating and/or coloring step may be included between steps of the method 300.

At a step 302, a metal tub (e.g. tub 101) is formed, according to some embodiments. As part of step 302, a metal sheet (e.g., a blank, a sheet metal, etc.) may be pressed into a die that forms the metal sheet into a tub shape. In an exemplary embodiment, the metal sheet is pressed (e.g., stamped, deep-drawn, etc.) into the tub shape shown in FIG. 2. In some embodiments, the metal sheet is pressed into a tub shape different than the tub shape shown in FIG. 2, according to other embodiments. In some embodiments, the wall 104 is integrally formed with the bottom 102 (e.g., is a single piece of material) and defines the internal volume 106 of the tub 101.

In some embodiments, the method 300 includes pressing the workpiece (e.g. the metal sheet, sheet metal, blank, etc.) into successive dies to achieve the predetermined tub shape. In some embodiments, the method 300 includes stress relieving heat treatment to reverse the effects of work hardening between forming steps to restore ductility and workability to the tub material. For example, some or all of the tub 101 may require at least one heat treatment to prevent tearing or breaking the material during one or more stamping processes.

In some embodiments, the metal tub may be colored and/or coated using a method such as electrophoretic plating or powder coating to color and/or seal one or more surfaces of the tub (e.g., external surfaces, internal surfaces, etc.). The coating applied to the tub during coloring and/or coating may prevent deterioration (e.g., corrosion) of the tub material (e.g., metal). In some embodiments, the coating applied to the metal tub may facilitate or function as a barrier between the underlying material of the tub 101 (e.g., metal, steel, aluminum, etc.) and potential contaminates or corrosives associated with the internal volume 106 (e.g., inadvertently leaked electrolyte, water, fluids, etc.) or external environment (humidity, salt, debris, etc.).

At a step 304, the metal tub is reinforced, according to some embodiments. The metal tub may be reinforced by the addition of stiffening features (e.g., stiffening features 110, beading, corrugation, etc.) and/or by the addition of cross members (e.g., stringers 206). The cross members may function as stringers and may be attached to the walls and bottom of the metal tub, as described in detail above.

At a step 306, at least one mounting bracket (e.g. mounting bracket 204) is added to the interior of the metal tub, according to some embodiments. The mounting brackets may be configured to releasably secure a battery (e.g., through a nut/bolt configuration) and are fixedly mounted (e.g., welded, bonded, fastened, etc.) to the interior surface of the metal tub. In some embodiments, the mounting brackets have threaded through-holes that are configured to receive a bolt with corresponding threading. In some embodiments, the mounting bracket 204 is welded or otherwise fixedly coupled to the tub 101.

At a step 308, at least one energy storage device (e.g. battery 202, hydrogen fuel cell, etc.) is inserted into the internal volume of the metal tub, according to some embodiments. For example, at least one battery is mounted to at least one of the mounting brackets. For example, the battery may be releasably secured to the mounting bracket, as discussed above.

At a step 310, a lid is sealed to the metal tub to thereby enclose and seal an internal volume (e.g., internal volume 106) defined by the bottom (e.g., bottom 102) and walls (e.g., wall 104) of the metal tub, according to some embodiments. The lid may be sealed to the metal tub by a sealing method including the use of adhesives, fasteners, one or more gaskets, or any combination thereof.

In some embodiments, the manufacturing process may include several cold working processes, including several stamping (e.g., deep-drawing) processes. A primary stamping process may substantially form the walls and the bottom (see, e.g., FIG. 1). Secondary or supplementary forming and/or shaping processes may be used to create additional features through processes such as beading, bulging, bottom piercing, ironing, necking, rib forming, side piercing, trimming, and/or curling. In an exemplary embodiment, the bottom of the tub includes stiffening features (e.g., stiffening beads, corrugation, ribbing, etc.) which enhance the structure and stiffness of the bottom and/or walls.

It is important to note that while operations in FIG. 6 are depicted in a particular order, this should not be understood as requiring that such operations be performed in the particular order shown or in sequential order or that all illustrated operations be performed to achieve desirable results. In certain circumstances, multitasking and parallel processing may be advantageous. For example, the operations of step 304 and step 306 may be performed concurrently. Moreover, any separation of various components in the embodiments described above should not be understood as requiring such separation in all embodiments.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the FIGURES and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. It should be appreciated that elements of the various embodiments may be incorporated or utilized with any of the other embodiments disclosed herein.

What is claimed is:

1. A battery enclosure for enclosing batteries for an electric vehicle, the battery enclosure comprising:
   a tub defining an internal volume, the tub having a bottom and a wall integrally formed with the bottom;
   a lid configured to couple to the wall to enclose the internal volume;
   a cross member within the internal volume and coupled to the tub, the cross member being formed using a roll forming process from a single piece of material; and
   a mounting bracket attached to the bottom of the tub and configured to releasably secure a battery.

2. The battery enclosure of claim 1, wherein the cross member extends laterally across the internal volume.

3. The battery enclosure of claim 1, wherein the lid is supported by the wall and at least one battery coupled to the mounting bracket.

4. The battery enclosure of claim 1, wherein the wall defines an interior surface; the cross member comprises a first end and a second end; and the first end is coupled to a first portion of the interior surface and the second end is coupled to a second portion of the interior surface.

5. The battery enclosure of claim 4, wherein the cross member is coupled to the bottom between the first end and the second end.

6. The battery enclosure of claim 1, wherein the cross member is a first cross member; further comprising a second cross member coupled to the tub and spaced from the first cross member.

7. The battery enclosure of claim 6, wherein the mounting bracket is coupled to the bottom between the first cross member and the second cross member.

8. The battery enclosure of claim 6, wherein the bottom comprises stiffening features formed in a space between the first cross member and the second cross member.

9. An enclosure for an electric vehicle comprising:
   a metal tub defining an internal volume;
   a lid configured to couple to the metal tub to enclose the internal volume;
   a plurality of supports within the internal volume and coupled to the metal tub, the plurality of supports comprising a first support and a second support; and
   a mounting plate coupled to the metal tub within a space between the first support and the second support;
   wherein the plurality of supports are configured to surround a battery within the internal volume on two sides of the battery; and
   wherein a wall of the metal tub has a first thickness and a bottom surface of the metal tub has a second thickness, the first thickness being less than the second thickness.

10. The enclosure of claim 9, wherein the metal tub is formed from a single sheet of metal via a deep-drawing process.

11. The enclosure of claim 10, wherein the single sheet of metal is steel or aluminum; and wherein at least one of the first thickness or the second thickness ranges from 0.5 mm to 2 mm.

12. The enclosure of claim 9, wherein the plurality of supports include martensitic steel.

13. The enclosure of claim 12, wherein the plurality of supports are shaped via a roll forming process.

14. The enclosure of claim 9, wherein a cross-sectional profile of each of the plurality of supports is one of an I-shape, T-shape, L-shape, or U-shape.

15. The enclosure of claim 11, wherein the first thickness is approximately 0.5 mm.

16. The enclosure of claim 15, wherein the second thickness is approximately 2 mm.

17. The enclosure of claim 9, wherein the metal tub comprises stiffening features in a region proximate the mounting plate.

18. The enclosure of claim 17, wherein the stiffening features comprises at least one of beading, corrugation, or ribbing.

* * * * *